United States Patent
Lam

(10) Patent No.: US 12,030,294 B2
(45) Date of Patent: Jul. 9, 2024

(54) COMPOSITE MATERIAL FOR USE IN A FACE MASK, AND A FACE MASK FORMED THEREOF

(71) Applicant: Juladore Limited, London (GB)

(72) Inventor: Hiu Ying Lam, Taipo (HK)

( * ) Notice: Subject to any disclaimer, the term of this patent is extended or adjusted under 35 U.S.C. 154(b) by 295 days.

(21) Appl. No.: 17/197,117

(22) Filed: Mar. 10, 2021

(65) Prior Publication Data

US 2022/0030966 A1 Feb. 3, 2022

(30) Foreign Application Priority Data

Jul. 30, 2020 (HK) .............. 32020012942.9

(51) Int. Cl.
| | |
|---|---|
| *B32B 5/00* | (2006.01) |
| *B32B 5/02* | (2006.01) |
| *B32B 5/24* | (2006.01) |
| *B32B 27/40* | (2006.01) |

(52) U.S. Cl.
CPC .............. *B32B 5/024* (2013.01); *B32B 5/24* (2013.01); *B32B 27/40* (2013.01); *B32B 2255/02* (2013.01); *B32B 2255/205* (2013.01); *B32B 2262/0276* (2013.01); *B32B 2571/00* (2013.01)

(58) Field of Classification Search
CPC .......... B32B 5/024; B32B 5/24; B32B 27/40; B32B 2255/02; B32B 2255/205; B32B 2262/0276; B32B 2571/00
USPC ...................................................... 428/209
See application file for complete search history.

(56) References Cited

U.S. PATENT DOCUMENTS

| | | | |
|---|---|---|---|
| 2008/0229929 A1* | 9/2008 | Marcoon ............ | B01D 46/0028 264/340 |
| 2010/0003891 A1* | 1/2010 | Chen .................. | A63H 3/04 446/385 |
| 2012/0328683 A1* | 12/2012 | Song .................. | C09D 7/63 424/78.37 |
| 2018/0117370 A1* | 5/2018 | Seo .................... | A62B 23/025 |
| 2022/0030966 A1* | 2/2022 | Lam ................... | A41D 13/1161 |

FOREIGN PATENT DOCUMENTS

| | | | | |
|---|---|---|---|---|
| CN | 204091059 U | | 1/2015 | |
| CN | 105771421 A | | 7/2016 | |
| CN | 205492690 U | * | 8/2016 | ............ A41D 13/11 |
| CN | 205492690 U | | 8/2016 | |
| CN | 111409341 A | | 7/2020 | |

OTHER PUBLICATIONS

A High-Efficient Environment-Friendly Mask Haze Containing Polylactic Acid. CN 205492690 U (Year: 2016).*
Search Report 32020012942.9 dated Sep. 8, 2020 by CNIPA on Hong Kong Short Term pat. appln.

* cited by examiner

*Primary Examiner* — Betelhem Shewareged
(74) *Attorney, Agent, or Firm* — Nevin Carmichael Consulting (NCC-IP); Nevin Carmichael

(57) ABSTRACT

The invention relates to a composite material for use in a face mask. The composite material comprises at least one fabric layer comprising a metallic fiber material; and at least one polymer layer laminated with the at least one fabric layer to form a single composite layer; wherein the at least one polymer layer is of substantially the same shape and size as the at least one fabric layer, such that any air stream passing through the composite layer will be effectively filtered by both the at least one fabric layer and the at least one polymer layer.

8 Claims, 2 Drawing Sheets

COMPOSITE MATERIAL FOR USE IN A FACE MASK, AND A FACE MASK FORMED THEREOF

This application claims priority to Hong Kong Short Term Patent Application No. 32020012942.9 filed on 30 Jul. 2020, and is incorporated herein for all purposes.

FIELD OF THE INVENTION

The invention relates to a composite material for use in a face mask, and particularly but not exclusively, to a composite material for use in a reusable face mask.

BACKGROUND OF THE INVENTION

Face masks are commonly used in the health care industry to reduce the risk of transferring infectious bacteria, virus and the like between the health care practitioners and the patients. Recently, face masks are becoming more widely used by the general public to control, reduce or prevent spreading of respiratory viruses like influenza, SARS, SARS-CoV-2, and COVID-19, or at least to serve as precautionary measures. Most face masks work by covering a wearer's face, and more particularly, nose and mouth of the wearer thereby blocking or filtering airborne droplets or aerosols which carry the harmful germs. Various types and designs of face masks, including disposable surgical masks and reusable face covers have been developed, which can be formed with different materials having different filtration efficacies applicable for different uses and purposes. Nonetheless, there exists a need for face masks that provide a more effective barrier to air-borne contaminants while still providing an improved comfortability and usability for the wearers.

OBJECTS OF THE INVENTION

An object of the present invention is to provide a novel material for use in a face mask.

Another object of the present invention is to provide a novel reusable face mask.

A further object of the present invention is to mitigate or obviate to some degree one or more problems associated with known face masks, or at least to provide a useful alternative.

The above objects are met by the combination of features of the main claims. The dependent claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a composite material for use in a face mask. The composite material comprises at least one fabric layer comprising a metallic fiber material; and at least one polymer layer laminated with the at least one fabric layer to form a single composite layer; wherein the at least one polymer layer is of substantially the same shape and size as the at least one fabric layer, such that any air stream passing through the composite layer will be effectively filtered by both the at least one fabric layer and the at least one polymer layer.

In a second main aspect, the invention provides a face mask. The face mask comprises a face covering portion formed of the composite material according to the first aspect, and a strap attached to the face covering portion.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

The present invention relates to a face mask and particularly, a reusable face mask which provides a close-fitting coverage around the wearer's nose, mouth and optionally chin to thereby minimize or eliminate the amount of airborne contaminants, such as virus, bacteria or the like, from being exhaled and/or inhaled by the wearer. The face mask provides a dual protection functionality, comprising a self-disinfecting layer as well as an effective filtration layer. The reusable face mask further allows good breathability i.e. moisture vapor transmission, with the face mask being reusable and the anti-microbial and filtration efficiencies maintained after about 50-100 times of washings.

Figure 1:
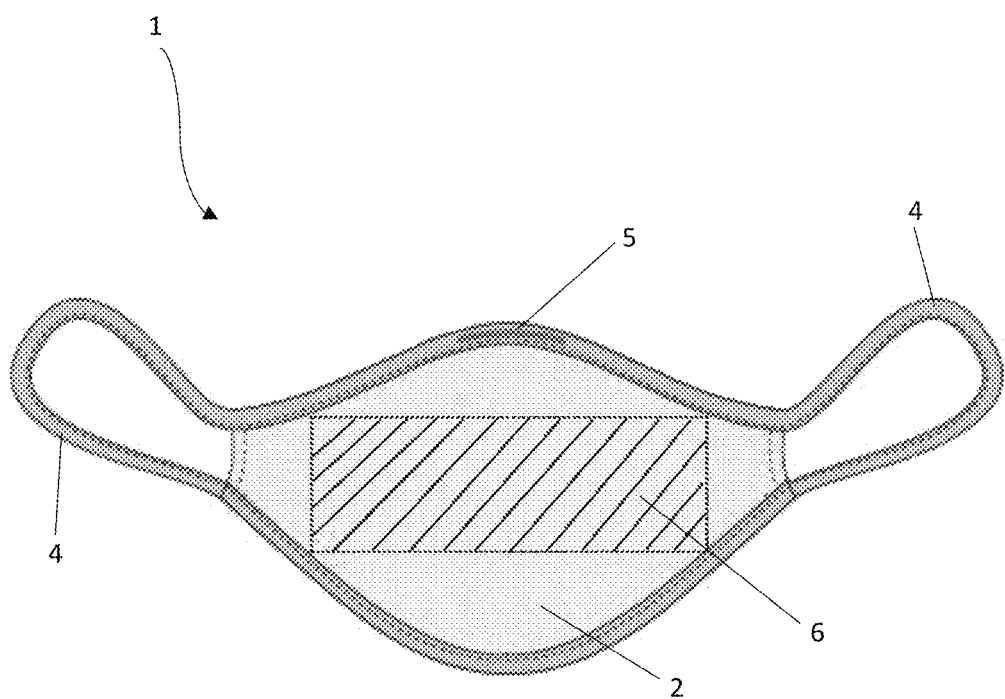
FIG. 1 is a schematic diagram showing a face mask in the prior art.

FIG. 1 shows a traditional reusable face mask 1 in the prior art. The face mask 1 comprises a mask body 2 for covering the face, and particularly the nose and mouth of the wearer. The mask body 2 generally comprises one or more layers of fabrics such as, but are not limited to, cotton, silk, and/or other natural or synthetic fiber materials. Very often the face mask 1 is provided with an elastic strap 4, which can be a head strap or ear straps affixed to or sewn at the two lateral sides of the mask body 2. The face mask 1 may further be provided with a nose clip 5 at an upper edge of the mask body 2 for positioning of the mask at, and for providing a closer fitting of the mask against the wearer's face.

As the filtration efficiency of the general fabric material is known to be limited, a filter layer 6, which is often provided as a rectangular sheet of porous materials such as microfibers, can optionally be inserted between the mask body 2 of the face mask 1 and the wearer's face to enhance the filtration effect. However, the filter layer 6 will unavoidably be movable within the face mask 1 due to movement of the wearer, which significantly reduces the overall filtration efficacy.

Some other face masks are therefore provided with an internal pocket or compartment for accommodating the filter layer 6 to keep the filter layer 6 in place. Nonetheless, movement of the filter layer 6 within the compartment may cause the filter layer 6 to become partially folded over within the compartment, which will adversely affect not only the filtration ability of the mask but also the user's comfort of wearing the mask.

Figure 2:
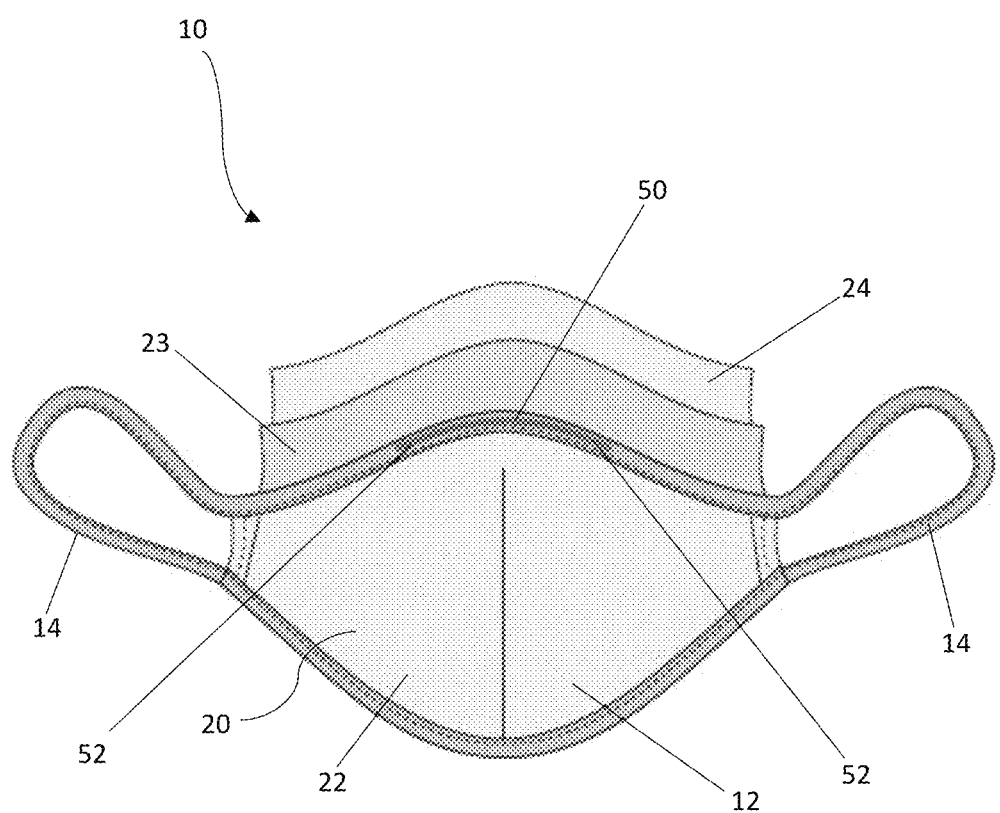
FIG. 2 is a schematic diagram showing a face mask according to an embodiment of the present invention.

Referring to FIG. 2, shown is an embodiment of a reusable face mask 10 according to the present invention. The reusable face mask 10 comprises a face covering portion 12 for covering the wearer's face and more particularly, the nose, mouth and optionally the chin of the wearer. In one embodiment, the face covering portion 12 is preferably configured in a substantially three-dimensional shape to generally conform with a shape of the nose of the wearer for closer fitting against the wearer's face. The face mask 10 further comprises a pair of elastic or resilient ear straps 14, such as the ear loops as shown in the figure, which can be sewn or affixed to the face covering portion 12 of the face mask 10. A person skilled in the relevant art will appreciate that any other known types of tying means, such as head ties, elastic bands, straps or the like, will also be applicable, as it is only necessary that the face mask 10 is provided with some suitable means of retaining the face mask 10 over a wearer's face.

Particularly, the face covering portion 12 of the face mask 10 is formed of a composite material comprising at least one fabric layer 20 having a metallic fiber material, such as but is not limited to, a metallic silver yarn material; and at least one polymer layer 23 laminated with the at least one fabric layer 20 to form a single composite layer. More particularly, the at least one polymer layer 23 is of substantially the same shape and size as the at least one fabric layer 20 such that the two layers substantially overlay each other, whereby any air stream passing through the composite layer will be effectively filtered by both the at least one fabric layer 20 and the at least one polymer layer 23.

In one embodiment, the at least one fabric layer 20 preferably comprises a first fabric layer 22 and a second fabric layer 24 configured to sandwich the at least one polymer layer 23 therebetween, as shown in FIG. 2, with the three layers being laminated to form a single composite layer.

Preferably, the at least one fabric layer 20, such as either one or both of the fabric layers 22, 24, comprises a metallic silver-coated fibre material such as a metallic silver-coated yarn material. More preferably, the metallic silver-coated fibre or yarn material comprises 99.9% pure silver metal coated polymer fibre, such as but is not limited to, a polyamide fibre. In one embodiment, the metallic silver-coated yarn material can be woven with one or more other fibre materials, such as one or more non-metallic fibre or yarn materials to form the at least one fabric layer 20. In one embodiment, the one or more non-metallic fibre materials may comprise synthetic fibre materials such as one or more of a polyester fibre or yarn material and a spandex fibre or yarn material. For example, in one specific embodiment, the at least one fabric layer 20 can be a woven piece of fabric comprising about 80% to about 90% by weight of the polyester fibre or yarn materials, about 5% to about 8% by weight of the spandex fibre or yarn material, and about 2% to about 15% by weight of the metallic silver-coated fibre or yarn material, although a skilled person will appreciate that the fabric layer 20 could also be formed by weaving the metallic silver-coated fibre or yarn with any other known fibres or yarns to thereby vary, adjust or customize the physical and/or chemical properties of the fabric layer 20 for different applications and purposes of the face mask 10.

In one embodiment, the at least one fabric layer 20, such as each of the first fabric layer 22 and the second fabric layer 24 is preferably of a thickness ranged from about 1.03 mm to about 1.05 mm.

The metallic silver-coated fibre or yarn material of the fabric layer 20 comprises metallic silver atoms, which can be oxidized to form silver ions. These silver ions are known to possess powerful anti-viral and anti-microbial abilities. Particularly, the positively charged metal ions are electrostatically attracted to the negatively charged bacteria, interfering or altering structure of the bacterial DNA and thus inhibiting replication of the bacteria. Metallic silver has also been proven to exhibit inhibiting activity against a broad-spectrum of pathogens including bacteria, virus, fungi or the like upon contact. The fabric layer 20 thus serves as a first-tier barrier against any air-borne contaminants by its self-disinfecting, anti-viral and anti-microbial effects due to the presence of the metallic silver-coated yarn, with the disinfecting effect further supported by the natural filtering action of the woven fabric of the fabric layer 20.

Preferably, the at least one polymer layer 23 comprises thermoplastic polyurethane (TPU) polymer. In one specific embodiment, the TPU polymer layer 23 is of a thickness ranged from about 0.02 mm to about 0.03 mm, and more preferably, about 0.025 mm. The TPU polymer layer 23 is preferably porous to allow an effective transmission of moisture vapor for an enhanced breathability. In one embodiment, the TPU polymer layer 23 is of a moisture vapor transmission rate (MVTR) of more than 9000 g/m$^2$× 24 hrs (measured based on the ASTM E96BW 2016 standard). More preferably, the TPU polymer layer 23 also demonstrates good water resistance and stretchability. For example, in one embodiment the TPU polymer layer 23 is of a water-resistance of more than 9000 mmH$_2$O (measured based on the JIS L1092B standard), and a stretchability of more than 15 MPa (measured based on the ASTM D882 standard).

The TPU polymer layer 23 thus serves as a second-tier barrier against the air-borne contaminants by providing an effective filtration layer. For example, with the single composite layer formed from lamination of the first fabric layer 22, the TPU polymer layer 23, and the second fabric layer 24, the resulting face mask 10 demonstrates a bacterial filtration efficiency (BFE) of more than 97%. In one embodiment, the bacterial filtration efficiency (BFE) is found to be maintained as more than 97% after 50-100 times of hand washings. In one embodiment, the composite layer formed from lamination of the first fabric layer 22, the TPU polymer layer 23, and the second fabric layer 24 is of a preferred thickness ranged from about 1 mm to about 2 mm, more preferably, about 1.05 mm to about 1.10 mm.

In one embodiment, it is preferred that the first fabric layer 22 and the second fabric layer 24 which sandwich the TPU polymer layer 23 each comprise the metallic silver fiber or yarn material. In another embodiment, only one of the two fabric layers 22, 24, such as the first, externally facing fabric layer 22, preferably comprises the metallic silver fiber or yarn material. In one further embodiment, one or more additional fabric layers formed from such as, but are not limited to, polypropylene fabric materials, cellulose fiber materials such as cotton and/or bamboo fabric materials, activated carbon comprising fabric materials, etc., can be added between the first and the second fabric layers 22, 24 to improve wearing comfort and/or to further increase the filtration efficacy. In one embodiment, these one or more additional fabric layers are preferably arranged between the TPU polymer layer 23 and the second fabric layer 24.

The face mask 10 may further comprise a nose engaging means 50, which can be provided in the form of an elongated deformable member arranged at a center region of an upper edge of the face covering portion 12 for a closer-fitting of the upper edge of the face mask 10 across the wearer's nose and face. In one embodiment, the nose engaging mean 50 may comprise a deformable wire or the like which forms a nose clip. The nose engaging means 50 may further comprise an extended portion 52, such as the two end extensions 52 as shown in the figure, to further allow a closer fitting of the face mask 10 against the wearer's face. Both the nose engaging means 50 and the extended portions 52 are preferably finger-manipulatable to allow conformation of the mask with a contour or contours of the wearer's face.

In one embodiment, the at least one fabric layer 20 and the at least one polymer layer 23 are laminated to form the single composite layer via a hot melt processing technique. In this process, polyurethane (PUR) heat melt adhesive is heated to a required viscosity and is transferred to the surface of the TPU polymer layer 23 in the form of melted adhesive dots. The melt adhesive will then be evenly spread out to become a homogenous thin layer and subsequently, binding the TPU polymer layer 23 with the one or more fabric layers 22, 24 under the action of a heated roller. The process is generally simple, fast and of relatively low cost which does not require complicated machinery and processing steps. Furthermore, the thin layer of adhesive when set does not substantially hinder the breathability of the resultant composite layer. In one further embodiment, the hot melt adhesive may also be spray under high temperature and pressure onto the TPU polymer layer 23 to allow atomization of the adhesive for a fine and even coating onto the TPU polymer layer 23.

In one embodiment, the composite layer is formed as a thin, flat sheet of composite layer material and then cut and sewn to form the face covering portion 12 of the mask 10 in a desired shape generally conforming to a shape of a user's face. The edges surrounding the face covering portion 12 may be formed as a seam extending around the face covering portion 12 to thereby strengthen the mask 10 and provide useful anchor points to which the ear straps 14 may be attached. The deformable elongated member 50 may be secured in position within an upper seam which, in use, extends across a user's nose and/or face. Preferably, the material forming the seam is also stretchable but with a certain degree of rigidity to strengthen the mask 10.

Forming the composite layer as a single composite flat layer and then cutting and sewing said layer provides a simple, straight forward and efficient way of mass producing a face mask using existing manufacturing facilities and furthermore, allows face masks of various sizes to be readily formed as required.

The stretchability of the composite layer renders the mask 10 more comfortable than many conventional masks to wear greatly reducing the user's tendency to adjust and therefore touch the mask 10 during use.

By forming the surrounding seam to have a degree of stretchability, although less than that of the composite layer, provides not only strength to the mask but also a closer fit around the edge of the mask, i.e. around the seam, to improve comfort, but, more importantly, to reduce air escaping past the edges of the mask when worn by a user when inhaling or exhaling.

A further benefit of forming a seam around the face covering portion 12 is to provide a convenient means for securing the deformable elongated member 50 such as a nose clip 50 in place and to allow an extension 52 of such member 50 to be included in the mask 10 to better conform the mask to a user's face over their nose and upper cheeks. Preferably, in an adult mask 10, the deformable member 50 is at least about 10 cm to about 12 cm in length and/or extends at least across 50% of the length of the top seam of the mask 10 and more preferably, equal to or more than 60% of the length of the top seam of the mask 10.

Although the embodiments as described and illustrated in the present specification relate to a composite material for use in a face mask or a face cover, the present invention shall not be limited only to this specific application. Instead, a skilled person in the relevant art should readily understood that the composite material and its manufacturing methods are also applicable to the manufacturing of other types of personal protective equipment such as, but are not limited to, protective clothing, gloves, hats, socks, shoes or the like, as well as other wearable items such as general clothing, gloves, footwears and headwears, etc. to protect the wearers from harmful contaminants.

The present invention is therefore advantageous in that it provides a reusable face mask comprising at least one anti-microbial, metallic silver-comprising fabric layer and at least one highly stretchable, water resisting and breathable filter layer. The two layers are shaped to substantially the same shape and size and are laminated to form a single composite layer via a heat melt lamination process. The resulting composite layer is extremely thin with superior breathability and stretchability, as well as a bacterial filtration efficiency of higher than 97% even after 50-100 washings. The metallic silver-comprising fabric layer provides a self-disinfecting effect, and is found to demonstrate an effective anti-microbial action to successfully reduce viability of harmful pathogens six times faster than a control fabric formed without the metallic silver yarn. The face mask of the present invention requires that the anti-microbial fabric layer and the water resisting and breathable TPU filter layer to be shaped to substantially the same shape and size and thus, for the layers to substantially overlaying each other to ensure that any air stream passing through the laminated, composite layer will have to be effectively filtered by both layers for a more effective protection from the air-borne contaminants.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A composite material for use in a face mask, comprising:
    at least one fabric layer comprising a first fabric layer and a second fabric layer, the first and the second fabric layers each comprises a metallic silver-coated fibre material, wherein the metallic silver-coated fibre material is woven with one or more non-metallic fibre materials to form the first and the second fabric layers; and
    at least one polymer layer arranged between the first fabric layer and the second fabric layer, wherein the at least one polymer layer is laminated with the first and the second fabric layers to form a single composite layer, wherein the at least one polymer layer comprises thermoplastic polyurethane (TPU);
    wherein the at least one polymer layer is of substantially the same shape and size as the first and the second fabric layers, such that any air stream passing through the composite layer will be effectively filtered by both the first and the second fabric layers and the at least one polymer layer;
    wherein the formed single composite layer demonstrates a bacterial filtration efficiency (BFE) of more than 97% and the bacterial filtration efficiency (BFE) is maintained after 50-100 washings.

2. The composite material according to claim 1, wherein the one or more non-metallic fibre materials comprise a polyester fibre material and/or an elastic fibre material.

3. The composite material according to claim 2, wherein the at least one fabric layer is a woven fabric comprising about 80% to about 90% by weight of the polyester fibre material, about 5% to about 8% by weight of the elastic fibre material, and about 2% to about 15% by weight of the metallic silver-coated fibre material.

4. The composite material according to claim 1, wherein the at least one fabric layer is of a thickness ranged from about 1.03 mm to about 1.05 mm.

5. The composite material according to claim 1, wherein the metallic silver-coated fibre material of the at least one fabric layer comprises metallic silver atoms oxidizable to form silver ions.

6. The composite material according to claim 1, wherein the at least one polymer layer is of a thickness ranged from about 0.02 mm to about 0.03 mm.

7. The composite material according to claim 1, wherein the formed single composite layer is of a thickness ranged from about 1 mm to about 2 mm.

8. The composite material according to claim 1, wherein the at least one polymer layer is laminated with the first and the second fabric layers to form the single composite layer via hot melt processing.

* * * * *